United States Patent
Johannsen et al.

(10) Patent No.: US 10,493,574 B2
(45) Date of Patent: Dec. 3, 2019

(54) TORQUE MONITORING DEVICE

(71) Applicant: Caterpillar Inc., Peoria, IL (US)

(72) Inventors: Eric J. Johannsen, Washington, IL (US); Timothy A. McKinley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 122 days.

(21) Appl. No.: 15/676,227

(22) Filed: Aug. 14, 2017

(65) Prior Publication Data
US 2019/0047097 A1 Feb. 14, 2019

(51) Int. Cl.
| | | |
|---|---|---|
| G01L 5/00 | (2006.01) | |
| B23P 19/06 | (2006.01) | |
| G01L 5/24 | (2006.01) | |
| G01L 3/14 | (2006.01) | |
| B25B 23/14 | (2006.01) | |
| B25B 21/00 | (2006.01) | |

(52) U.S. Cl.
CPC .......... *B23P 19/065* (2013.01); *B23P 19/066* (2013.01); *B25B 21/00* (2013.01); *B25B 23/14* (2013.01); *G01L 3/1414* (2013.01); *G01L 3/1435* (2013.01); *G01L 5/24* (2013.01)

(58) Field of Classification Search
CPC ...... B23P 19/065; B23P 19/066; B25B 23/14; G01L 3/1414; G01L 3/1435; G01L 5/24
USPC ........................................................ 73/761
See application file for complete search history.

(56) References Cited

U.S. PATENT DOCUMENTS

| | | |
|---|---|---|
| 7,331,246 B2 | 2/2008 | Escoe et al. |
| 8,922,199 B2 | 12/2014 | McConnell et al. |
| 9,156,148 B2 | 10/2015 | King et al. |
| 2002/0104398 A1* | 8/2002 | Pawlak ............... F16H 25/2472 74/424.75 |
| 2005/0223856 A1 | 10/2005 | Reynertson et al. |
| 2010/0192705 A1* | 8/2010 | Chu ........................ B25B 23/14 73/862.338 |
| 2012/0132042 A1 | 5/2012 | Bruce |
| 2012/0132043 A1 | 5/2012 | Chen et al. |
| 2014/0222012 A1* | 8/2014 | Belkoff .............. A61B 17/8875 606/104 |
| 2016/0031070 A1 | 2/2016 | Ball |

FOREIGN PATENT DOCUMENTS

WO 20130117807 8/2013

* cited by examiner

*Primary Examiner* — Max H Noori
(74) *Attorney, Agent, or Firm* — Hibshman Claim Construction PLLC

(57) ABSTRACT

A torque monitoring device for a fastener is provided. The torque monitoring device includes a sensing element mounted within the fastener. The sensing element measures a value of fastener elongation. The torque monitoring device also includes a receiving element coupled to a torque machine. The receiving element is communicably coupled with the sensing element. The receiving element is configured to receive the value of fastener elongation from the sensing element. The receiving element is also configured to generate an alert for terminating a torque operation being performed by the torque machine when the value of fastener elongation exceeds a pre-set value of fastener elongation.

15 Claims, 4 Drawing Sheets

TORQUE MONITORING DEVICE

TECHNICAL FIELD

The present disclosure relates to a torque monitoring device for a fastener.

BACKGROUND

Machines generally include a fastener for coupling two or more machine components with each other. For example, tracked machines, such as tractors and excavators, include an undercarriage system for propelling the machines on ground. The undercarriage system includes track links that are coupled to track shoes by a pair of fasteners.

During a coupling operation, the fasteners are tightened by applying a torque on the fastener so that the fastener is held under a certain amount of clamping force in operation. Currently, the clamping force is analyzed based on a value of fastener torque, that is, an amount of force required to turn the fastener. However, such a technique of analyzing whether sufficient clamping force is applied on a bolted joint is inaccurate and unreliable. Further, the fasteners have a tendency to elongate over a period of time, resulting in loss of the clamping force. The loss in clamping force affects stress in the bolted joint, which is not desirable.

U.S. Publication Application Number 2012/132042 describes a mechanical torque wrench for engaging a workpiece. The torque wrench includes a wrench body and a wrench head pivotably secured to the wrench body at a pivot joint. The mechanical torque wrench further includes a workpiece engaging portion and a bar extending therefrom, a hand grip, a set spring, a block disposed between a rear face of the bar and the set spring, an adjustment assembly for selecting a preset torque value, a resistive element producing a first output signal, a sensor producing a second output signal, and a processor for converting the first output signal into the preset torque value and converting the second output signal into an applied torque value. The application of a peak applied torque value to the workpiece causes the wrench head to pivot relative to the wrench body.

SUMMARY OF THE DISCLOSURE

In one aspect of the present disclosure, a torque monitoring device for a fastener is provided. The torque monitoring device includes a sensing element mounted within the fastener. The sensing element measures a value of fastener elongation. The torque monitoring device also includes a receiving element coupled to a torque machine. The receiving element is communicably coupled with the sensing element. The receiving element is configured to receive the value of fastener elongation from the sensing element. The receiving element is also configured to generate an alert for terminating a torque operation being performed by the torque machine when the value of fastener elongation exceeds a pre-set value of fastener elongation.

In another aspect of the present disclosure, a method of performing a torque operation on a fastener for coupling a first component with a second component is provided. The torque operation is performed by a torque machine. The method includes mounting a sensing element within the fastener, wherein the sensing element measures a value of fastener elongation. The method also includes coupling a receiving element with a torque machine. The receiving element is communicably coupled with the sensing element. Further, the receiving element receives the value of fastener elongation from the sensing element. The method further includes performing a torque operation on the fastener for coupling the first and second components. The method includes generating an alert, by the receiving element, when the value of fastener elongation exceeds a pre-set value of fastener elongation. The method also includes terminating the torque operation based on the alert generated by the receiving element.

In yet another aspect of the present disclosure, an undercarriage joint is provided. The undercarriage joint includes a track shoe adapted to contact a ground surface. The undercarriage joint also includes a track link for coupling with the track shoe. The undercarriage joint further includes a fastener for coupling the track link with the track shoe. The fastener including a sensing element mounted therein for measuring a value of fastener elongation. The torque machine is used to perform a torque operation on the fastener for coupling the track link with the track shoe. The torque machine includes a receiving element communicably coupled with the sensing element. The receiving element is configured to receive the value of fastener elongation from the sensing element. The receiving element is also configured to generate an alert for terminating the torque operation when the value of fastener elongation exceeds a pre-set value of fastener elongation.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
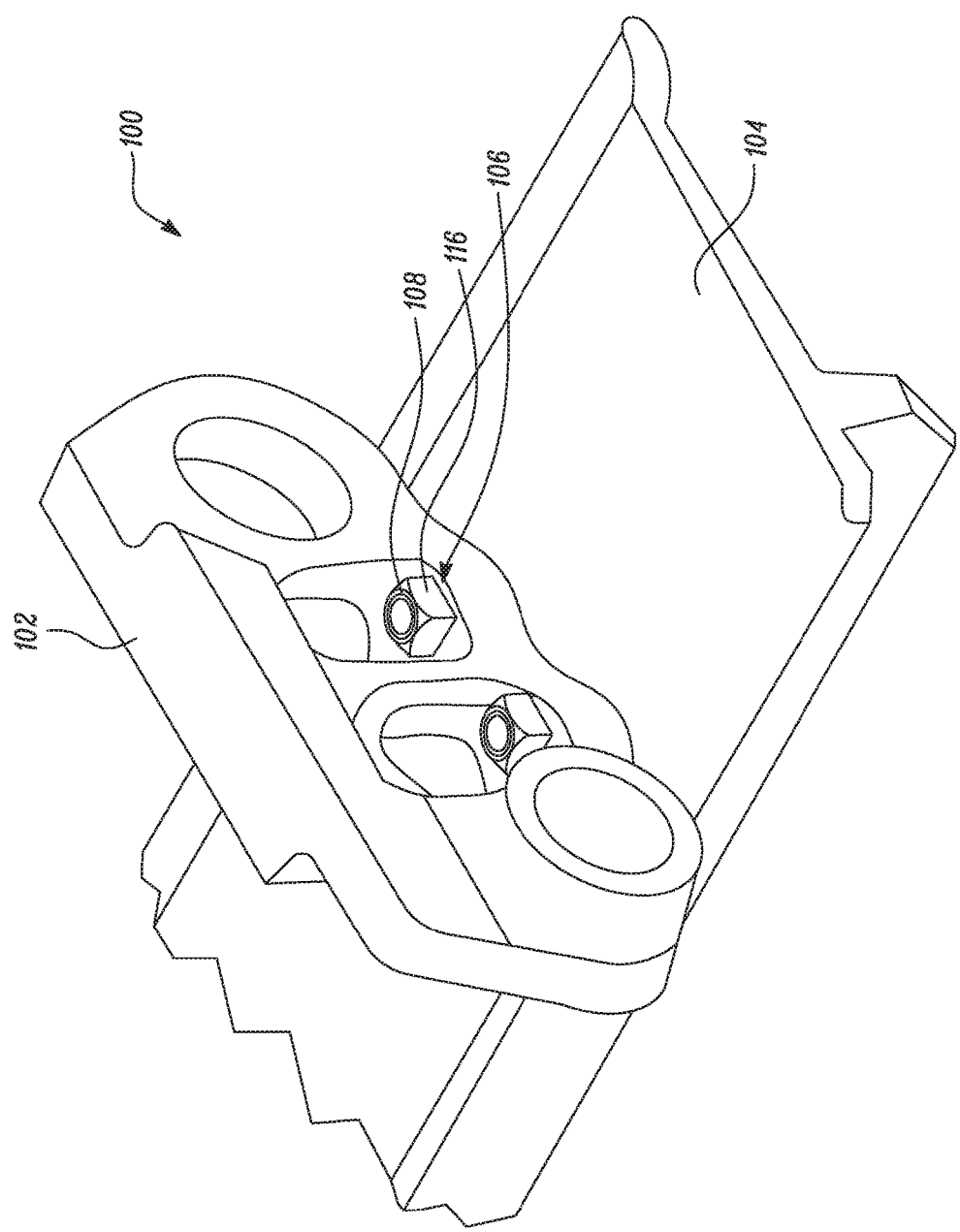
FIG. 1 is a perspective view of an exemplary undercarriage joint, according to one embodiment of the present disclosure.

FIG. 1 is a perspective view of an undercarriage joint 100 associated with a tracked machine (not shown). The machine may be embodied as a track type tractor, a tracked excavator, or any other tracked machine, without any limitations. Further, the machine can operate at a worksite, such as, a mine, a landfill, a quarry, a construction site, and the like. The machine may perform operations associated with an industry such as mining, construction, farming, transportation, or any other industry.

The undercarriage joint 100 is a part of an undercarriage system (not shown) that allows propulsion of the machine on ground surface. The undercarriage system may include various components (not shown) such as a track assembly. The track assembly includes a number of track shoes 102 (one of which is shown in FIG. 1). The track shoes 102 contacts and engages with the ground surface as the machine moves on the ground surface. The track assembly also includes a number of track links 104 (one of which is shown in FIG. 0.1). Further, the track link 104 is coupled to an associated track shoe 102 by a bolted joint 106. More particularly, the track link 104 is coupled with the respective track shoe 102 by a pair of fasteners 108.

Each of the track link 104 and the track shoe 102 includes apertures (not shown) that are aligned to receive the fasteners 108. The fasteners 108 include a head portion 110 (shown in FIG. 3). The head portion 110 is embodied as a hexagonal head portion, without any limitations. Further, the fastener 108 includes a body portion 112 (shown in FIG. 3). The body portion 112 extends from the head portion 110, such that a height of the body portion 112 is greater than a height of the head portion 110. The body portion 112 includes a number of threads 114 (shown in FIG. 3) for threadably coupling the fastener 108 with the track shoe 102 and the track link 104, respectively. The threads 114 also couple with a nut 116 for tightening the bolted joint 106.

The fastener 108 may include any one of a bolt or a screw, without any limitations. In the illustrated embodiment, the fastener 108 couples a first component with a second component, where the first component is the track link 104 and the second component is the track shoe 102, without limiting the scope of the present disclosure. However, it should be noted that the fastener 108 may be used to couple any two components or more than two components with each other, without limiting the scope of the present disclosure.

Figure 2:
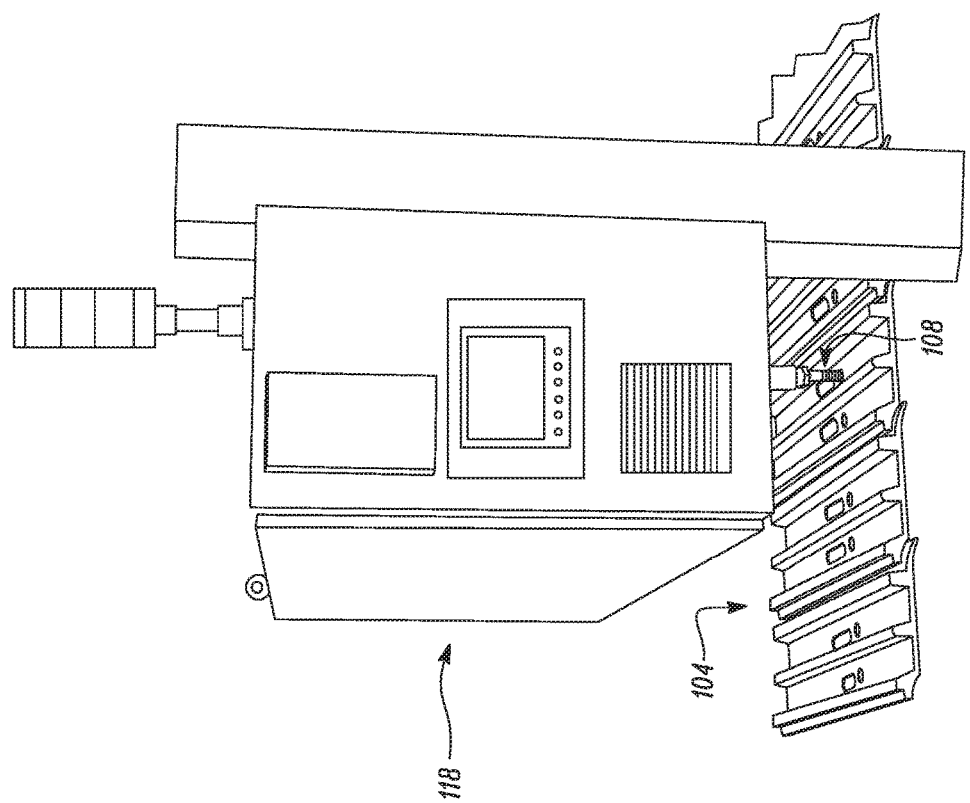
FIG. 2 is a schematic view of an exemplary set-up for performing a torque operation on a fastener of the undercarriage joint of FIG. 1, according to one embodiment of the present disclosure.

Referring now to FIG. 2, an exemplary torque machine 118 and the number of track links 104 is illustrated. The torque machine 118 is used to perform a torque operation on the fastener 108 for coupling the track link 104 with the track shoe 102 (see FIG. 1). More particularly, the torque machine 118 applies a fastener torque on the fastener 108 till a clamping force of the bolted joint 106 (see FIG. 1) corresponds to a desired clamping force. It should be noted that an application of the fastener torque causes an elongation of the fastener 108. In one example, a value of the fastener elongation is used to calculate the clamping force. It should be noted that the torque machine 118 may include any known in the art torque machine 118, such as a hydraulically operated torque machine, a pneumatically operated torque machine, a mechanically operated torque machine, and the like, without any limitations.

In one example, the torque machine 118 is embodied as an autonomous machine. In such an example, the torque machine 118 includes a control module 120 (shown in FIG. 3) associated therewith. The control module 120 may store instructions to operate the torque machine 118. Further, the control module 120 may send and receive signals from various components of the torque machine 118 to perform the torque operation on the fastener 108. In another example, the torque machine 118 may be manually operated.

Figure 3:
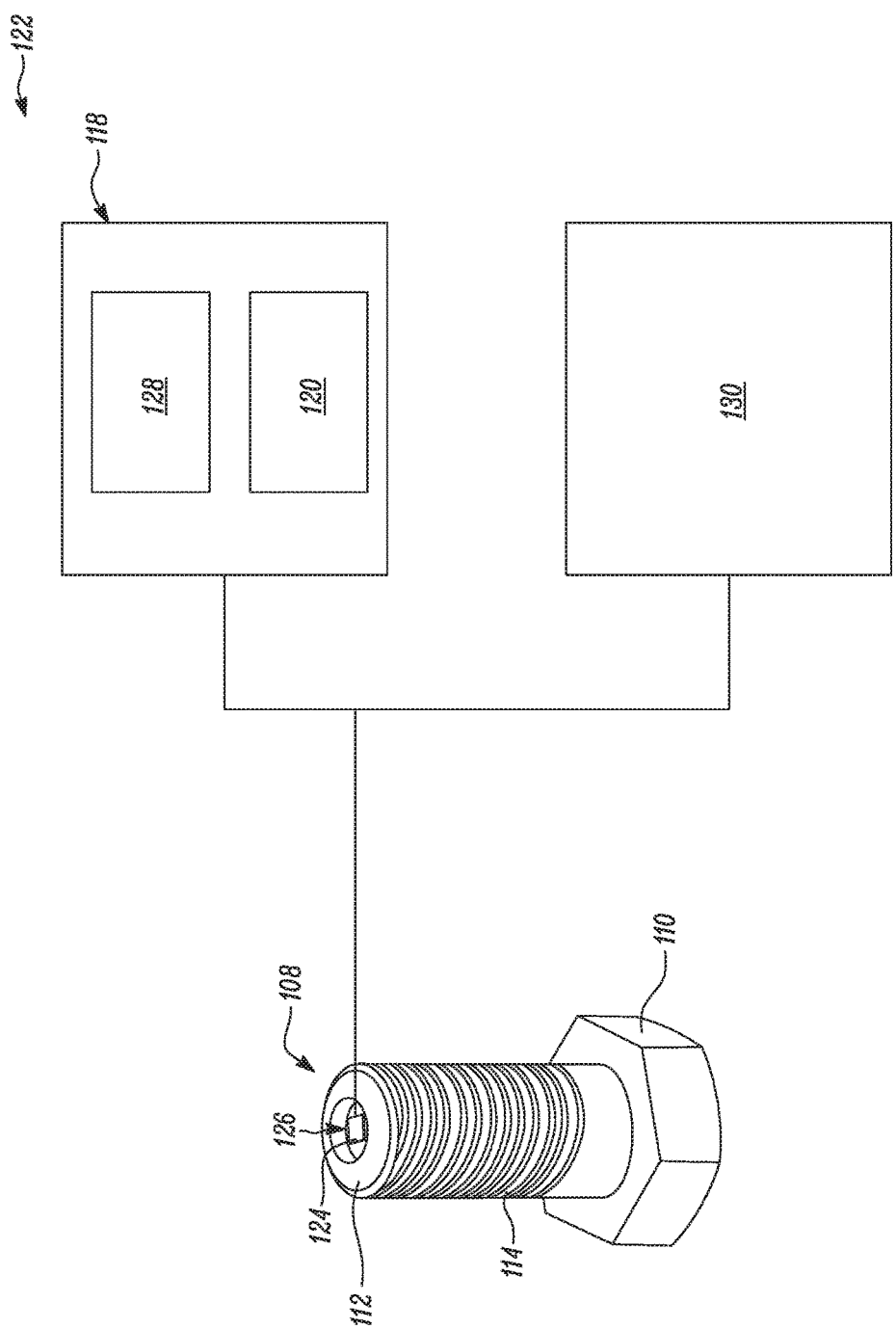
FIG. 3 is a schematic view of a torque monitoring device, according to one embodiment of the present disclosure.

Referring to FIG. 3, the present disclosure relates to a torque monitoring device 122. The torque monitoring device 122 is used to monitor the value of fastener elongation. Further, the torque monitoring device 122 generates an alert for terminating the torque operation being performed by the torque machine 118 if the value of fastener elongation exceeds a pre-set value of fastener elongation. The term "pre-set value of fastener elongation" used herein is indicative of a value of fastener elongation that is required to achieve an optimum fastener torque, during the coupling of the track link 104 and the track shoe 102. Further, the pre-set value of fastener elongation may be stored in a memory of the control module 120 or a database (not shown), without any limitations.

The torque monitoring device 122 includes a sensing element 124. The sensing element 124 is used to measure the value of fastener elongation of the fastener 108. Further, the sensing element 124 is capable of wirelessly transmitting the value of fastener elongation to other devices. The sensing element 124 is mounted within the fastener 108. In one example, the sensing element 124 may be mounted within a counter bore 126 provided in the fastener 108. The counter bore 126 may be provided within the head portion 110 or the body portion 112 of the fastener 108. In the illustrated example, the counter bore 126 is provided within the body portion 112. The sensing element 124 may include an ultrasonic sensor or a magnetic sensor. For example, the sensing element 124 may include a piezoelectric sensor for measuring the value of fastener elongation.

In another example, the sensing element 124 includes a spring element (not shown) for measuring the value of fastener elongation. The spring element may be provided within a bore (not shown) formed within the fastener 108. In some examples, the bore for accommodating the spring element may be different in dimensions than the counter bore 126 formed in the fastener 108, without any limitations. It should be noted that the sensing element 124 may include any known in the art sensor that can measure the value of elongation or stretching of the fastener 108, without limiting the scope of the present disclosure.

The torque monitoring device 122 also includes a receiving element 128. The receiving element 128 is associated and coupled with the torque machine 118. The receiving element 128 may be embodied as a receiving chip that is capable of interfacing with various devices to transmit and receive signals. Further, the receiving element 128 is also capable of processing the signals received thereby, without any limitations. It should be noted that the receiving element 128 may be embodied as a stand-alone device or the receiving element 128 may be integrated with the control module 120, without any limitations.

The receiving element 128 is in communication with each of the sensing element 124 and the control module 120, and is capable of sending and receiving signals therefrom. More particularly, the receiving element 128 receives the value of fastener elongation from the sensing element 124. Based on the signals received from the sensing element 124, the receiving element 128 generates the alert for terminating the torque operation being performed by the torque machine 118. More particularly, the receiving element 128 compares the value of fastener elongation with the pre-set value of fastener elongation. The receiving element 128 may retrieve the pre-set value of fastener elongation from the control module 120. If the value of fastener elongation exceeds the pre-set value of fastener elongation, the receiving element 128 generates the alert for terminating the torque operation. The receiving element 128 generates and transmits the alert for terminating the torque operation to the control module 120. The control module 120 terminates the torque operation on the fastener 108, based on the alert received from the receiving element 128.

Further, when the torque machine 118 is manually operated, an operator performing the torque operation may terminate the torque operation based on the alert generated by the receiving element 128. In such an example, the receiving element 128 may include an indicating means, such as an LED indicator, to alert the operator. Alternatively, the torque machine 118 may include a display device (not shown). The receiving element 128 or the control module 120 may be communicably coupled to the display device. The display device may display an alert notification to notify the operator that the torque operation needs to be terminated as the value of fastener elongation has exceeded the pre-set value of fastener elongation.

Further, the sensing element 124 is also in communication with a central machine system 130. The central machine system 130 may be located at a remote location. The central machine system 130 may receive, store, and process various machine related information for maintenance purposes or for monitoring if machine components are performing in an intended manner.

In one example, the central machine system 130 receives the value of fastener elongation from the sensing element 124. Further, based on the received value of fastener elongation, the central machine system 130 generates an alert indicative of any variation of the clamping force in the fastener 108 due to the elongation of the fastener 108. More particularly, the central machine system 130 compares the value of fastener elongation with the pre-set value of fastener elongation. If the value of fastener elongation is less than the pre-set value of fastener elongation, the central machine system 130 generates an alert indicating that the clamping force in the bolted joint 106 has reduced below the desired clamping force. Accordingly, a maintenance personnel may be deployed to evaluate and service the bolted joint 106 so that the clamping force in the bolted joint 106 corresponds to the desired clamping force.

It should be noted that the control module 120 and the central machine system 130 may embody a single microprocessor or multiple microprocessors for receiving signals from components of the torque machine 118 and the torque measuring device 122. Numerous commercially available microprocessors may be configured to perform the functions of the control module 120 and the central machine system 130. A person of ordinary skill in the art will appreciate that the control module 120 and the central machine system 130 may additionally include other components and may also perform other functions not described herein.

INDUSTRIAL APPLICABILITY

The present disclosure relates to the torque monitoring device 122 for the fastener 108. In the illustrated embodiment, the fastener 108 is used to couple the track link 104 with the track shoe 102. Alternatively, an application of the torque monitoring device 122 can be extended to a number of applications in which two or more components are coupled using one or more fasteners.

The torque monitoring device 122 allows measurement of the value of fastener elongation and generates the alert to terminate the torque operation when the value of fastener elongation exceeds the pre-set value of fastener elongation. Thus, the fastener 108 is subjected to an optimum amount of the fastener torque so that the desired clamping force is achieved in the bolted joint 106.

The sensing element 124 associated with the fastener 108 provides an easy technique to measure the elongation of the fastener 108. Also, the fastener 108 with the sensing element 124 can be easily retrofitted on an existing machine in field by customers of the machine. Further, the sensing element 124 is communicably coupled with the central machine system 130. The central machine system 130 generates the alert indicative of reduction in the clamping force of the bolted joint 106 when the value of fastener elongation reduces below the pre-set value of fastener elongation. This gives an idea to the maintenance personnel regarding a current condition of the bolted joint 106 and also regarding its expected service life. Thus, the maintenance personnel may accordingly replace or service the fastener 108, or tighten the bolted joint 106, thereby reducing any machine downtime.

Figure 4:
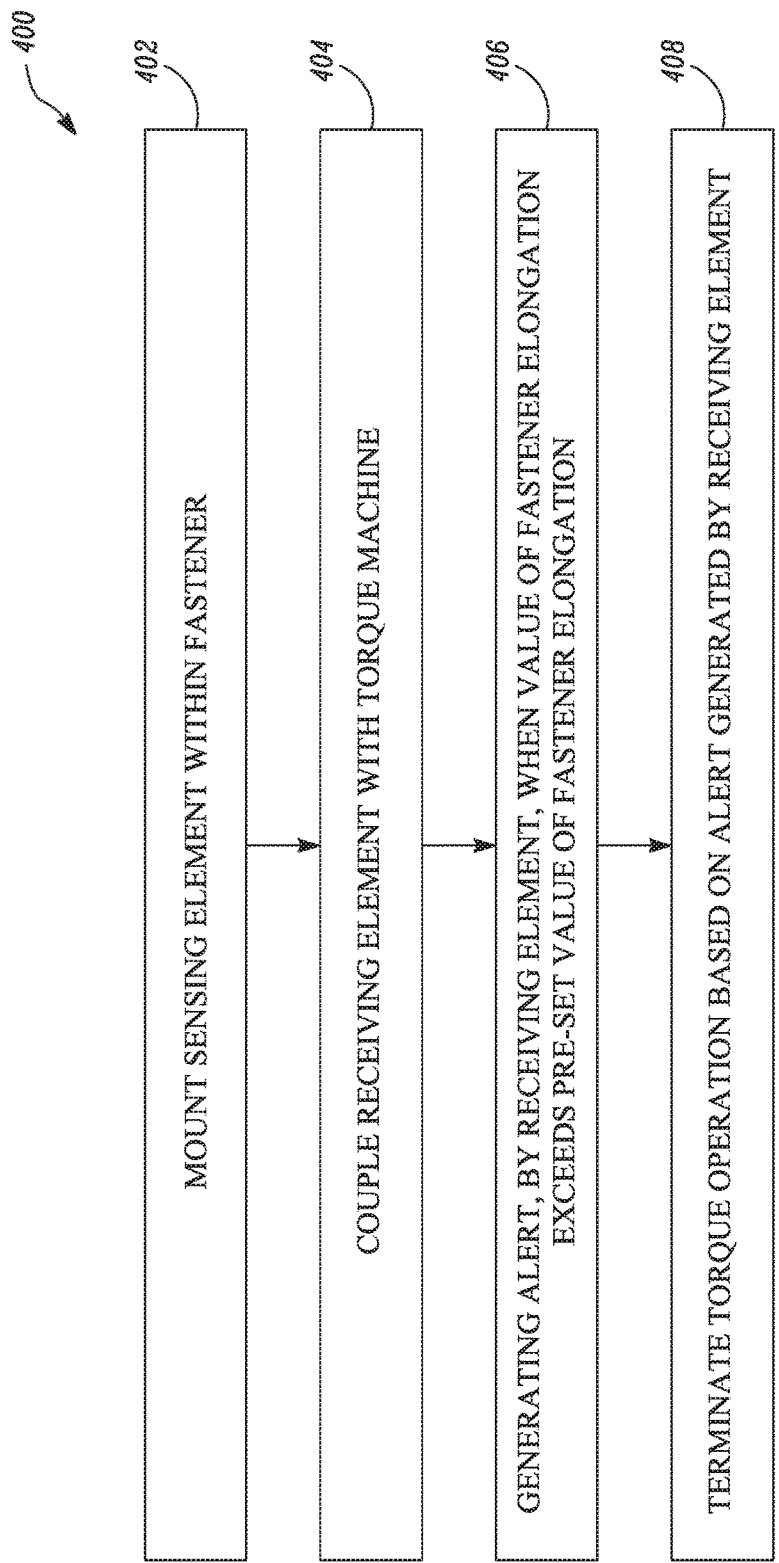
FIG. 4 is a flowchart of a method for performing the torque operation on the fastener, according to one embodiment of the present disclosure.

FIG. 4 illustrates a method 400 of performing the torque operation on the fastener 108 for coupling the first component with the second component. The first component is the track link 104 of the undercarriage joint 100 and the second component is the track shoe 102 of the undercarriage joint 100. The torque operation is performed by the torque machine 118.

At step 402, the sensing element 124 is mounted within the fastener 108. More particularly, the sensing element 124 is mounted within the counter bore 126 provided within the fastener 108. The sensing element 124 measures the value of fastener elongation. In one example, the sensing element 124 includes the ultrasonic sensor or the magnetic sensor. In another example, the sensing element 124 includes the spring element for measuring the value of fastener elongation.

At step 404, the receiving element 128 is coupled with the torque machine 118. The receiving element 128 is communicably coupled with the sensing element 124. The receiving element 128 receives the value of fastener elongation from the sensing element 124. At step 406, the torque operation is performed on the fastener 108 for coupling the track link 104 with the track shoe 102. At step 408, the receiving element 128 generates the alert if the value of fastener elongation exceeds a pre-set value of fastener elongation. At step 410, the torque operation is terminated based on the alert generated by the receiving element 128. More particularly, the receiving element 128 is communicably coupled with the control module 120 associated with the torque machine 118. The control module 120 terminates the torque operation based on the alert received from the receiving element 128.

Further, the sensing element 124 is also communicably coupled with the central machine system 130. The central machine system 130 receives the value of fastener elongation from the sensing element 124. The central machine system 130 also generates the alert indicative of the clamping force in the fastener 108 based on the value of fastener elongation received from the sensing element 124.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A torque monitoring device for a fastener, the torque monitoring device comprising:
   a sensing element mounted within a counter bore of the fastener, wherein the sensing element measures a value of fastener elongation; and
   a receiving element coupled to a torque machine, the receiving element being communicably coupled with the sensing element, wherein the receiving element is configured to:
      receive the value of fastener elongation from the sensing element; and
      generate an alert for terminating a torque operation being performed by the torque machine when the value of fastener elongation exceeds a pre-set value of fastener elongation.

2. The torque monitoring device of claim 1, wherein the sensing element includes at least one of an ultrasonic sensor and a magnetic sensor.

3. The torque monitoring device of claim 1, wherein the sensing element includes a spring element for measuring the value of fastener elongation.

4. The torque monitoring device of claim 1, wherein the receiving element is communicably coupled with a control module associated with the torque machine, the control module being configured to terminate the torque operation based on the alert received from the receiving element.

5. The torque monitoring device of claim 1, wherein a central machine system is communicably coupled with the sensing element, the central machine system being configured to:
   receive the value of fastener elongation from the sensing element; and
   generate an alert indicative of clamping force in the fastener based on the value of fastener elongation received from the sensing element.

6. The torque monitoring device of claim 1, wherein the fastener is a track bolt that couples a track link of an undercarriage joint with a track shoe of the undercarriage joint.

7. An undercarriage joint comprising:
   a track shoe adapted to contact a ground surface;
   a track link for coupling with the track shoe; and
   a fastener for coupling the track link with the track shoe, the fastener defining a counterbore therein and including a sensing element mounted within the counterbore for measuring a value of fastener elongation,
   wherein a torque machine is used to perform a torque operation on the fastener for coupling the track link with the track shoe, the torque machine including a receiving element communicably coupled with the sensing element, wherein the receiving element is configured to:
      receive the value of fastener elongation from the sensing element; and
      generate an alert for terminating the torque operation when the value of fastener elongation exceeds a pre-set value of fastener elongation.

8. The undercarriage joint of claim 7, wherein the sensing element includes at least one of an ultrasonic sensor and a magnetic sensor.

9. The undercarriage joint of claim 7, wherein the sensing element includes a spring element for measuring the value of fastener elongation.

10. The undercarriage joint of claim 7, wherein the receiving element is communicably coupled with a control module associated with the torque machine, the control module being configured to terminate the torque operation based on the alert received from the receiving element.

11. The undercarriage joint of claim 7, wherein a central machine system is communicably coupled with the sensing element, the central machine system being configured to:
   receive the value of fastener elongation from the sensing element; and
   generate an alert indicative of clamping force in the fastener based on the value of fastener elongation received from the sensing element.

12. A torque monitoring device for a fastener, the torque monitoring device comprising:
   a sensing element mounted within the fastener, wherein the sensing element measures a value of fastener elongation; and
   a receiving element coupled to a torque machine, the receiving element being communicably coupled with the sensing element, the receiving element being configured to:
      receive the value of fastener elongation from the sensing element; and
      generate an alert for terminating a torque operation being performed by the torque machine when the value of fastener elongation exceeds a pre-set value of fastener elongation,
   wherein the sensing element includes at least one of an ultrasonic sensor, a magnetic sensor, and a spring element for measuring the value of fastener elongation.

13. The torque monitoring device of claim 12, wherein the receiving element is communicably coupled with a control module associated with the torque machine, the control module being configured to terminate the torque operation based on the alert received from the receiving element.

14. The torque monitoring device of claim 12, wherein a central machine system is communicably coupled with the sensing element, the central machine system being configured to:
   receive the value of fastener elongation from the sensing element; and
   generate an alert indicative of clamping force in the fastener based on the value of fastener elongation received from the sensing element.

15. The torque monitoring device of claim 12, wherein the fastener is a track bolt that couples a track link of an undercarriage joint with a track shoe of the undercarriage joint.

* * * * *